United States Patent
Scarcelli et al.

(10) Patent No.: US 11,060,912 B2
(45) Date of Patent: Jul. 13, 2021

(54) MULTI-STAGE PARALLEL SPECTROSCOPY SYSTEMS AND METHODS

(71) Applicant: University of Maryland, College Park, College Park, MD (US)

(72) Inventors: Giuliano Scarcelli, Washington, DC (US); Antonio Fiore, Greenbelt, MD (US)

(73) Assignee: UNIVERSITY OF MARYLAND, COLLEGE PARK, College Park, MD (US)

(*) Notice: Subject to any disclaimer, the term of this patent is extended or adjusted under 35 U.S.C. 154(b) by 0 days.

(21) Appl. No.: 16/705,694

(22) Filed: Dec. 6, 2019

(65) Prior Publication Data

US 2020/0182694 A1 Jun. 11, 2020

Related U.S. Application Data

(60) Provisional application No. 62/776,324, filed on Dec. 6, 2018.

(51) Int. Cl.
*G01J 3/18* (2006.01)
*G01J 3/02* (2006.01)
(Continued)

(52) U.S. Cl.
CPC ............ *G01J 3/18* (2013.01); *G01J 3/0208* (2013.01); *G01J 3/44* (2013.01); *G01J 2003/1204* (2013.01)

(58) Field of Classification Search
CPC .... G01J 3/18; G01J 3/0208; G01J 3/44; G01J 3/04; G01J 2003/1204
See application file for complete search history.

(56) References Cited

U.S. PATENT DOCUMENTS 6,765,724 B1 * 7/2004 Kramer ............... G02B 5/1866
356/328
7,898,656 B2 3/2011 Yun et al.
(Continued)

FOREIGN PATENT DOCUMENTS

WO WO 2018/140602 A1 8/2018
WO WO 2019/089531 A1 5/2019

OTHER PUBLICATIONS

Qinghua Yang, "Compact orthogonal-dispersion device using a prism and a transmission grating", 2018 (Year: 2018).*
(Continued)

*Primary Examiner* — Maurice C Smith
(74) *Attorney, Agent, or Firm* — RowanTree Law Group, PLLC; Frederick F. Rosenberger

(57) ABSTRACT

A multi-stage parallel spectroscopy system has a plurality of dispersion stages, with the output of one dispersion stage serving as input to the next dispersion stage. Each dispersion stage separates input radiation into respective spectral components along a respective dispersion axis. In embodiments, the dispersion axes for the dispersion stages are substantially parallel to each other. Thus, the disclosed systems may be considered single-axis parallel spectroscopy configurations, in contrast to cross-axis parallel spectroscopy configurations. An optical system disposed in an optical path between dispersion stages can spatially filter a set of wavelengths from the input to the next dispersion stage to increase spectral extinction without sacrificing throughput or parallel operation. In some embodiments, the same dispersive element provides the spectral separation for multiple dispersion stages, by way of a recirculating optical system that redirects the spectral output from the dispersive element back to its input.

22 Claims, 8 Drawing Sheets

(51) Int. Cl.
*G01J 3/44* (2006.01)
*G01J 3/12* (2006.01)

(56) References Cited

U.S. PATENT DOCUMENTS

| | | | |
|---|---|---|---|
| 10,386,288 B2 | 8/2019 | Scarcelli et al. | |
| 2003/0048442 A1* | 3/2003 | Xiao | G01J 3/04 356/328 |
| 2006/0082772 A1* | 4/2006 | Kehoe | G01J 3/0208 356/328 |
| 2016/0177366 A1* | 6/2016 | Auner | C12Q 1/14 435/5 |
| 2018/0188173 A1 | 7/2018 | Scarcelli et al. | |
| 2018/0284010 A1 | 10/2018 | Scarcelli et al. | |
| 2020/0256726 A1 | 8/2020 | Scarcelli et al. | |
| 2020/0278250 A1 | 9/2020 | Scarcelli et al. | |
| 2020/0355554 A1 | 11/2020 | Scarcelli et al. | |

OTHER PUBLICATIONS

Samuel C. Barden, "A simple, high efficiency, high resolution spectropolarimeter", 2012 (Year: 2012).*
Qinghua Yang, "Compact orthogonal-dispersion device using a prism and a transmission grating ",Springer, 2018 (Year: 2018).*
Barden, Samuel, "A simple, high efficiency, high resolution spectropolarimeter" 2012 (Year: 2012).*
Antonacci et al., "Elastic suppression in Brillouin imaging by destructive interference," *Applied Physics Letters*, Aug. 2015, 107(6): Paper No. 061102 (4 pages).
Edrei et al., "Noise reduction in Brillouin microscopy via spectral coronagraphy," *Frontiers in Optics*, Sep. 2017, Paper No. FM4B.2. (2 pages).
Fiore et al., "High-extinction virtually imaged phased array-based Brillouin spectroscopy of turbid biological media," *Applied Physics Letters*, May 2016, 108(20): Paper No. 203701. (4 pages).
Fiore et at, "Single etalon design for two-stage cross-axis VIPA spectroscopy," *Biomedical Optics Express*, Feb. 2019, 10(3): pp. 1475-1481. (7 pages).
Mock et al., "Construction and performance of a Brillouin scattering set-up using a triple-pass tandem Fabry-Perot interferometer," *Journal of Physics E: Scientific Instruments*, Jun. 1987, 20(6): pp. 656-659. (5 pages).
Scarcelli et al., "Cross-axis cascading of spectral dispersion," *Optics Letters*, Dec. 2008, 33(24): pp. 2979-2981. (9 pages).
Scarcelli et al., "Multistage VIPA etalons for high-extinction parallel Brillouin spectroscopy," *Optics Express*, May 2011, 19(11): pp. 10913-10922. (10 pages).
Scarcelli et al., "Noncontact three-dimensional mapping of intracellular hydromechanical properties by Brillouin microscopy," *Nature Methods*, Dec. 2015, 12(12): pp. 1132-1134. (12 pages).
Vogt et al., "HIRES: the high-resolution echelle spectrometer on the Keck 10-m Telescope," *Proceedings of the Society of Photo-Optical Instrumentation Engineers*, 1994, 2198: pp. 362-375. (14 pages).

* cited by examiner

MULTI-STAGE PARALLEL SPECTROSCOPY SYSTEMS AND METHODS

CROSS-REFERENCE TO RELATED APPLICATIONS

The present application claims the benefit of U.S. Provisional Application No. 62/776,324, filed Dec. 6, 2018, which is hereby incorporated by reference herein in its entirety.

FIELD

The present disclosure relates generally to spectroscopy and spectroscopy systems, and more particularly, to parallel spectrometry methods and parallel spectrometers employing multiple dispersion stages.

BACKGROUND

Optical dispersive elements can be used to process the spectrum of an input radiation beam by dispersing its spectral components in different angular or spatial directions. The separation of light into its spectral components can be used to perform or enable operations on the input radiation. Such operations can include filtering the spectrum of the input radiation (e.g., in combination with masks, apertures, etc.), tailoring the spectrum of the radiation (e.g., in combination with modulators, wave-plates, etc.), and/or operating as a spectrometer to analyze the spectrum (e.g., in combination with an appropriate radiation detector, such as a charge-coupled device (CCD) image sensor or complementary metal-oxide semiconductor (CMOS) image sensor).

An exemplary quality metric for spectral analysis, which may find particular importance in spectrometry applications, is the dynamic range. The dynamic range indicates the ability of a spectrometer to simultaneously measure signals of different frequencies having different strengths. High dynamic range is enabled by the dynamic range of the detector (or of the detecting procedure) and the spectral extinction (or spectral contrast) of the spectrometer. Spectral extinction, as used herein, refers to the residual fraction of a given spectral component that is incorrectly detected in neighboring spectral channels.

Additional parameters used to characterize and describe performance of a spectrometer include resolution, throughput, and sensitivity. The resolution can refer to the minimal separation in spectral components that the spectrometer can detect. Throughput denotes a ratio between the fraction of energy that is not lost and the overall input energy. Alternatively or additionally, insertion loss or light gathering power metrics can be used. Sensitivity indicates a minimal radiation power required by the instrument to effectively measure the spectrum.

Existing high extinction spectroscopy instruments using multiple dispersive elements rely on a scanning approach (e.g., using grating monochromators or Fabry-Perot interferometers), where only a single spectral frequency can be measured at a time. In such instruments, the full spectrum is obtained by sequential measurements at each wavelength/frequency. Accordingly, these instruments are relatively slow for spectral analysis and otherwise limited in their ability to process spectral information.

In existing instruments that analyze the whole spectrum at once (referred to herein as parallel or single-shot spectrometers), the use of multiple dispersive elements rely on a cross-axis configuration, where a dispersion axis of one of the dispersive elements is different than the dispersion axis of another of the dispersive elements. However, the cross-axis configuration may introduce degradation in the instrument spectral linewidth, which degradation can negatively affect precision of the spectral measurement. The cross-axis configuration may also require cumbersome alignment for optimal performance.

Embodiments of the disclosed subject matter may address one or more of the above-noted problems and disadvantages, among other things.

SUMMARY

Embodiments of the disclosed subject matter provide parallel spectroscopic processing of a multi-wavelength radiation beam using multiple dispersion stages arranged in series, with the output of a dispersion stage serving as the input to a subsequent dispersion stage. Each dispersion stage can have one or more dispersive elements that separate input radiation into respective spectral components along a respective dispersion axis. In embodiments, the dispersion axes for the dispersion stages are substantially parallel to each other (e.g., within 5°), yielding a "single-axis" parallel spectroscopy configuration. An optical system between dispersion stages can spatially filter a set of wavelengths from the input to the next dispersion stage to increase spectral extinction without sacrificing throughput or parallel operation.

In some embodiments, the same dispersive element provides the spectral separation for multiple dispersion stages. A recirculating optical system can redirect the spectral output from the dispersive element back to its input. Such embodiments can be applied to single-axis spectroscopy configurations, where dispersion axes produced after each pass through the same dispersive element are substantially parallel to each other. In these single-axis configurations, the recirculating optical system may also include optical components to spatially filter a set of wavelengths from the radiation redirected to the input in order to increase spectral extinction. In other embodiments, the same dispersive element used for multiple dispersion stages is applied to cross-axis spectroscopy configurations, where a dispersion axis produced after one pass through the dispersive element is different than a dispersion axis produced after a subsequent pass through the same dispersive element.

In one or more embodiments, a parallel spectroscopy system comprises a first dispersion stage, a second dispersion stage, and an optical system. The first dispersion system is constructed to spatially separate radiation input to the first dispersion stage into respective spectral components along a first dispersion axis. The second dispersion system is constructed to spatially separate radiation input to the second dispersion stage into respective spectral components along a second dispersion axis. The first dispersion axis is substantially parallel to the second dispersion axis. The optical system is disposed in an optical path between an output of the first dispersion stage and an input of the second dispersion stage. The optical system is constructed to direct a first set of wavelengths in the spectral components output from the first dispersion stage to the input of the second dispersion stage. The optical system is also constructed to prevent or at least attenuate a second set of wavelengths in the spectral components output from the first dispersion stage from input to the second dispersion stage, while allowing the first set of wavelengths to simultaneously pass to the input of the second dispersion stage.

In one or more embodiments, a method for parallel spectroscopy comprises spatially separating input radiation into spectral components along a first dispersion axis. The method can further comprise directing a first portion of the spatially-separated spectral components to a subsequent dispersion stage while filtering a second portion of the spatially-separated spectral components. The directing the first portion simultaneously passes multiple wavelengths to the subsequent dispersion stage. The method can also comprise further spatially separating said first portion along a second dispersion axis. The first dispersion axis is substantially parallel to the second dispersion axis.

In one or more embodiments, a parallel spectroscopy system comprises a dispersion stage and an optical system. The dispersion stage is constructed to spatially separate radiation input to the dispersion stage into respective spectral components along a dispersion axis. The optical system is constructed to redirect the spectral components output from the dispersion stage back to an input of the dispersion stage, such that the radiation is processed by the dispersion stage more than once. In some embodiments, the dispersion stage and optical system provide a single-axis configuration, where each pass of radiation through the dispersion stage is separated along a dispersion axis that is substantially parallel to that of the other passes of radiation through the same dispersion stage. In other embodiments, the dispersion stage and optical system provide a cross-axis configuration, where a pass of radiation through the dispersion stage is separated along a dispersion axis that crosses that of another pass of radiation through the same dispersion stage.

In one or more embodiments, a method for parallel spectroscopy comprises spatially separating a first input of radiation into spectral components along a first dispersion axis using a dispersion stage. The method further comprises redirecting an output from the dispersion stage to serve as a second input to the dispersion stage, and spatially separating the second input into spectral components along a second dispersion axis using the dispersion stage. In some embodiments, the redirecting and the spatially separating the second input are such that the first and second dispersion axes are substantially parallel to each other. In other embodiments, the redirecting and the spatially separating the second input are such that the first and second dispersion axes cross each other.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. For example, in some figures, the propagation of light has not been shown or has been illustrated using block arrows or solid lines rather than employing ray diagrams. Throughout the figures, like reference numerals denote like elements.

DETAILED DESCRIPTION

Embodiments of the disclosed subject matter relate to systems and methods for performing parallel spectroscopy using multiple cascaded dispersion stages. In some embodiments, the dispersion stages separate radiation input thereto into spectral components along respective dispersion axes that are substantially parallel (e.g., within 5°) to each other. In such embodiments, the spectroscopy system can be referred to as a "single-axis" or "parallel-axis" system. In some embodiments, at least two of the dispersion stages comprise the same dispersive element. The output radiation from an upstream dispersion stage having the dispersive element can be redirected back to the input of the dispersion stage (with or without intervening dispersions stages), such that the dispersion stage also serves as a downstream stage with the same dispersive element reprocessing the radiation. In such embodiments, the spectroscopy can be referred to as a "single-axis recirculating" or "parallel-axis recirculating" system.

Figure 1A:
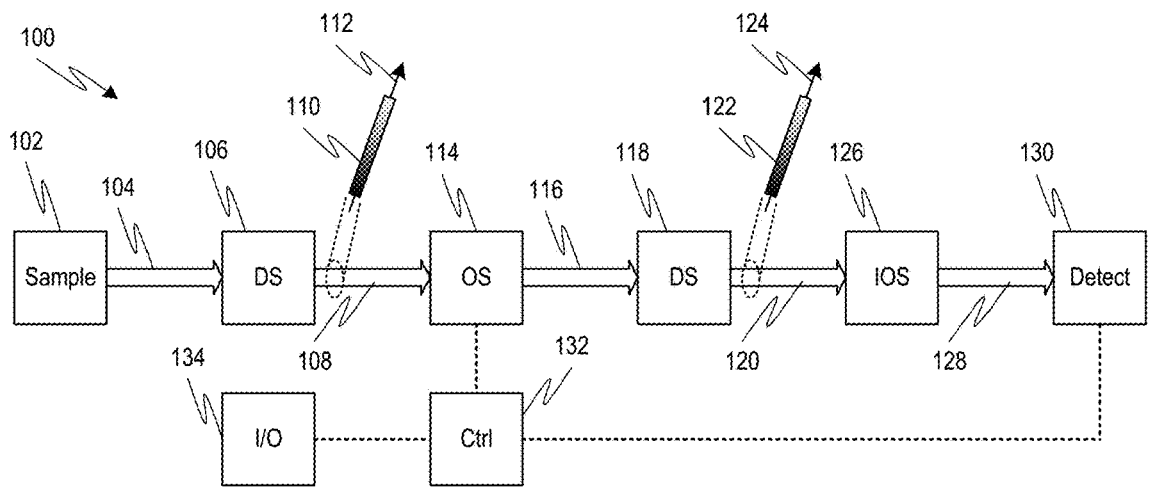
FIG. 1A is a simplified schematic diagram of a generalized optical system for single axis multi-stage parallel spectroscopy, according to one or more embodiments of the disclosed subject matter.

Referring to FIG. 1A, a simplified configuration of a multi-stage parallel spectroscopy system 100 is illustrated. The system 100 can include first and second spectral dispersion stages 106, 118 cascaded along an optical axis of the system. Radiation 104 (e.g., wavelengths in the ultra-violet, visible, and/or infra-red spectrum) received from a sample 102 can be directed to the first dispersion stage 106 by an optical system (not shown, e.g., microscope optics). The first dispersion stage 106, which includes at least a dispersive element and optionally other optical components (e.g., lenses, filters), processes the input radiation 104 to yield output 108. In particular, the processing by the first dispersion stage separates the input radiation 104 into its spectral components 110 along a first dispersion axis 112.

Figure 1B:
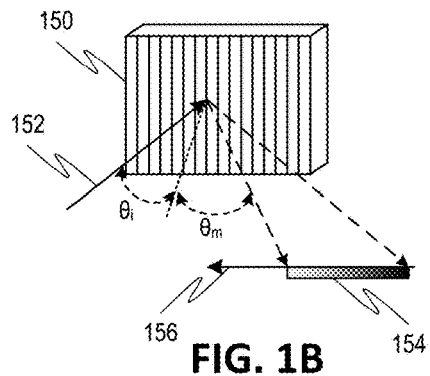
FIGS. 1B and 1C illustrate exemplary dispersive elements, in particular, a grating and an etalon, respectively, that can be employed in one or more dispersion stages.
Figure 1C:
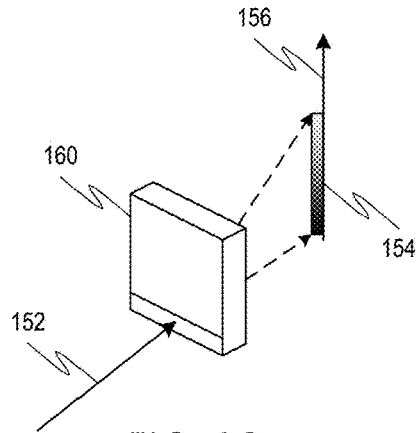

As used herein, dispersive element refers to an optical device that can separate different spectral components (i.e., having different frequency or wavelength) of the radiation, for example, by spatial or angular separation. Referring to FIG. 1B, a diffraction grating 150 that can be used as the dispersive element in one or more of the spectral dispersion stages is illustrated. Input radiation beam 152 is incident on a processing surface of the grating 150 at an angle $\theta_i$. The different wavelengths in the input radiation beam 152 are reflected from the processing surface at different angles $\theta_m$ corresponding to their wavelength, thereby yielding a separation of spectral components 154 along a dispersion axis or direction 156.

Figure 2A:
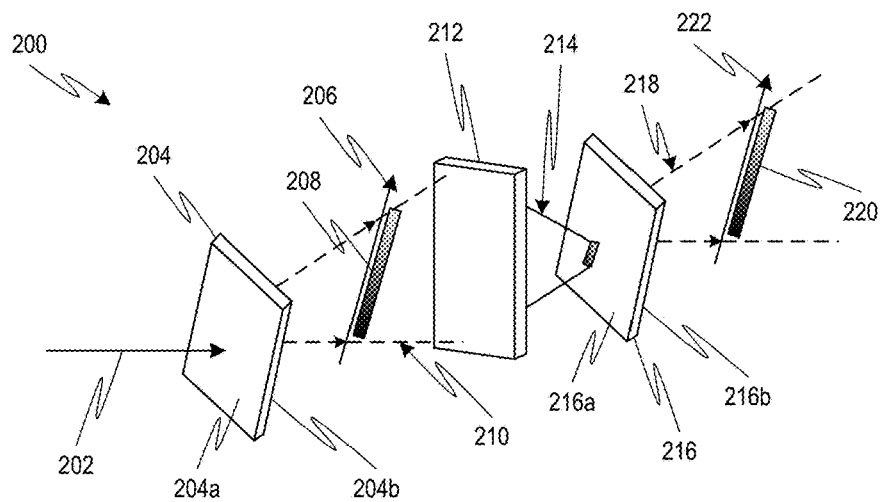
FIG. 2A illustrates a simplified exemplary arrangement of dispersive elements for two-stage single-axis parallel spectroscopy, according to one or more embodiments of the disclosed subject matter.
Figure 2B:
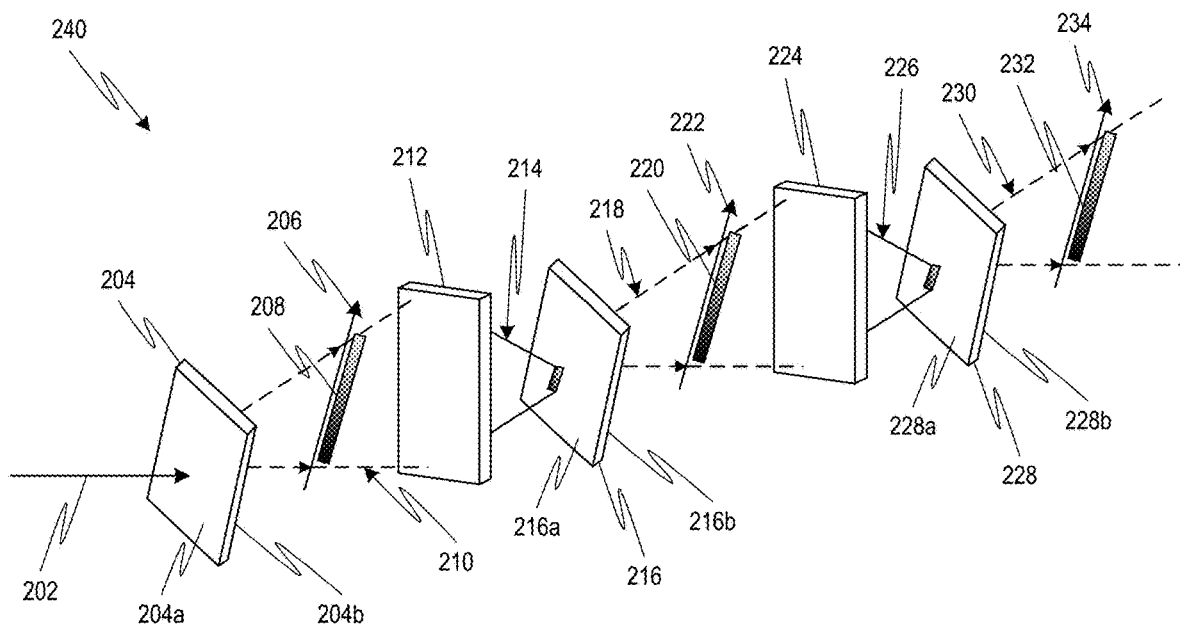
FIG. 2B illustrates a simplified exemplary arrangement of dispersive elements for three-stage single-axis parallel spectroscopy, according to one or more embodiments of the disclosed subject matter.

Alternatively or additionally, the dispersive element in one or more of the spectral dispersion stages can be a virtually imaged phase array (VIPA) etalon 160, as illustrated in FIG. 2B. Input radiation beam 152 is incident on an input window of the VIPA etalon 160. Internal reflections within the etalon 160 yield an output beam where the spectral components 154 are separated along dispersion axis 156. Dispersive elements and configurations besides the above described diffraction grating 150 and VIPA etalon 160, such as echelle-type gratings, Fabry-Perot etalons, and prisms, are also possible according to one or more contemplated embodiments.

Returning to FIG. 1A, the output beam 108 from the first dispersion stage 106 is processed by an optical system 114 and directed as input beam 116 to the second dispersion stage 118. The second spectral dispersion stage 118, which includes at least a dispersive element and optionally other optical components (e.g., lenses, filters), processes the input radiation 116 to yield output 120. In particular, the processing by the second dispersion stage further separates the input radiation 116 into its spectral components 122 along a second dispersion axis 124.

The first spectral dispersion stage 106 and the second spectral dispersion stage 118 can be identical to (e.g., employing the same type of dispersive element) or different (e.g., employing different types of dispersive elements) from each other. However, the first and second spectral dispersion stages 106, 118 generate separation of spectral components along dispersion axes 112, 124 that are substantially parallel to each other. Although only two spectral dispersion stages 106, 118 are illustrated in the single-axis cascading configuration of FIG. 1A, additional dispersion stages are also possible according to one or more contemplated embodiments.

Indeed, the parallel alignment of dispersion axes can allow for additional dispersion stages to be similarly arranged downstream of dispersion stage 118, thereby enabling input radiation 104 to be dispersed an arbitrary number of times without changing dispersion axis at each stage. Such properties of the disclosed single-axis cascading configuration can facilitate alignment of components in practical parallel spectroscopy systems. In contrast, alignment in conventional cross-axis cascading is less straightforward, with the scalability to Nth dispersive stage (with N≥2) being more cumbersome and experiencing degradation in terms of spectrum quality.

As noted above, the spectral extinction, or spectral contrast, of a spectrometer refers to the residual fraction of a given spectral component that is incorrectly directed to (or detected in) neighboring spectral channels. If a spectrometer has poor spectral contrast, the dominant spectral component will overshadow adjacent spectral components of smaller strength. To improve spectral extinction, optical system 114 between adjacent dispersion stages 106, 118 can include optical elements that filter out or remove (or at least substantially attenuate) certain undesirable spectral components from the output beam 108, such that input beam 116 includes only a subset of desired spectral components (e.g., having more than one wavelength). Alternatively or additionally, the optical system 114 can prevent (or at least substantially attenuate) the undesirable spectral components in the output beam 108 from being input to the second dispersion stage 118, for example, by redirecting those components along a path in beam 116 that is outside the numerical aperture for input to dispersion stage 118.

The optical system 114 can include various optical components, such as but not limited to optical filters (e.g., longpass filter, shortpass, filter, bandpass filter, or spatial filters such as masks (e.g., slits or pinholes)) and imaging systems (e.g., lenses, mirrors, etc.). The removal of a portion of the spectrum by the optical system 114 increases spectral extinction without sacrificing throughput and parallel spectroscopic operation. Otherwise, if optical system 114 did not remove part of the spectrum, the spectral separation generated by the first dispersion stage 106 may be lost, or at least degraded, in the input beam 116 to the second dispersion stage 118 due to the redirecting/focusing by the optical system 114. This situation is avoided in conventional parallel spectrometers using cross-axis cascade configurations because the spectral dispersion direction of a previous stage can be left untouched by introducing a second spectral dispersion along a different spectral axis. This situation is also avoided in scanning spectrometers because at each stage only a single spectral component is selected to be sent to the following spectral stage.

In embodiments, the undesirable spectral components may be wavelengths having an intensity that would otherwise obscure measurement of desired spectral components, which may be weaker intensity signals at adjacent wavelengths. For example, one or more of the undesirable spectral components has an intensity of at least 10 times larger than that of at least one or more of the desired spectral components. The undesirable spectral components may be offset from the desired spectral components by 1-10 GHz (i.e., <0.02 nm, or even <0.001 nm, depending on the wavelength of the undesirable spectral component). For example, the desired spectral components may be Brillouin scattered light, Raman or Rayleigh-wing scattered or fluorescence light, or any other light signal.

When configured as a spectrometer, system 100 can further include a detector 130, for example, having an array of pixels for detecting spatially separated radiation 128 delivered thereto. For example, the detector can be a charge-coupled device (CCD) image sensor, a complementary metal-oxide semiconductor (CMOS) image sensor, or any other radiation detecting sensor. An imaging optical system 126 can be disposed in the optical path between the last dispersion stage 118 and the detector 130. The imaging optical system 126 can include one or more optical components (e.g., lenses, mirrors, etc.) that focus the output beam 120 from the second dispersion stage 118 onto a detecting surface of the detector 130.

The system 100 can optionally include a control system 132 and an input/output device 134 (e.g., display, keyboard, mouse, etc.). For example, the control system 132 can be operatively coupled to the detector 130 to receive one or signals therefrom indicative of the detected radiation. The control system 132 can process the signals to yield an image of the sample 102, which image may be displayed to a user via input/output device 134.

In some embodiments, one or more of the optical components of the optical system 114 can be adjustable, for example, to change the spectral components that are removed from output beam 108. For example, a spatial filter of the optical system 114 can have a motor-controlled aperture and/or can be moved along the optical axis of the system 100 by a linear actuator. Control system 132 can be operatively coupled to this adjustable component to control operation thereof. A user of the system 100 can instruct the desired spectral components and/or the undesirable spectral components (or corresponding wavelength ranges) via input/output device 134, which instructions can be effected by appropriate control of the adjustable component of optical system 114 by control system 132. Alternatively or additionally, control system 132 can change a magnification/demagnification offered by components of optical system 114 in order to adjust attenuation or alter wavelengths subject to removal/attenuation by optical system 114.

FIG. 2A illustrates a generalized configuration of a two-stage single-axis parallel spectroscopy system 200. An input radiation beam 202 is directed to an input face or window 204a of a first spectral dispersion stage 204 (e.g., etalon as dispersive element). The dispersion stage 204 generates an output beam 210 emanating from its output face 204b, where the input radiation beam 202 has been separated into its spectral components 208 along dispersion axis 206. Optical system 212 processes output beam 210 and spectral components therein to form an input beam 214. Input beam 214, including a subset of the separated spectral components, is directed to an input face or window 216a of a second spectral dispersion stage 216 (e.g., etalon as dispersive element). The dispersion stage 216 generates output beam 218 emanating from its output face 216b, where the input radiation beam 214 has been further separated into spectral components 220 along dispersion axis 222, which is the same as (i.e., substantially parallel to) dispersion axis 206. Spectral contrast of the overall output 218 is increased by virtue of the two spectral dispersion stages 204, 216 as well as the arrangement of components (e.g., lenses, mirrors, filters, masks, etc.) of optical system 212 between stages 204, 216.

Although only two dispersion stages are shown in FIG. 2A, additional dispersion stages can be added by simply providing to the optical path after output 218 additional optical systems and dispersion stages in an arrangement similar to that of stages 204, 216 and optical system 212. For example, FIG. 2B shows an exemplary configuration of a three-stage single-axis spectroscopy system 240. Thus, second optical system 224 processes output beam 218 and spectral components therein to form an input beam 226. In some embodiments, the second optical system 224 may be configured to remove a portion of the spectrum from transmission to the next dispersion stage (e.g., as input beam 226), similar to operation of the second optical system 224. Alternatively, only optical system 212 may be configured to remove the portion of the spectrum, and second optical system 224 instead form input beam 226 to include all spectral components of beam 218 provided thereto. Input beam 226 is directed to an input face or window 228a of a third spectral dispersion stage 228 (e.g., etalon as dispersive element). The dispersion stage 228 generates output beam 230 emanating from its output face 228b, where the input radiation beam 226 has been further separated into spectral components 232 along dispersion axis 234, which is the same as (i.e., substantially parallel to) dispersion axes 206, 222.

Additional dispersion stages can be added after third dispersion stage 228 in a similar manner, to provide a parallel spectroscopy system having an arbitrary number of dispersion stages. The ultimate output beam (e.g., 218, 230, etc.) can be directed to an appropriate detector for measurement of the separated spectral components (e.g., by way of an imaging optical system between the last dispersion stage and the detector).

Figure 3A:
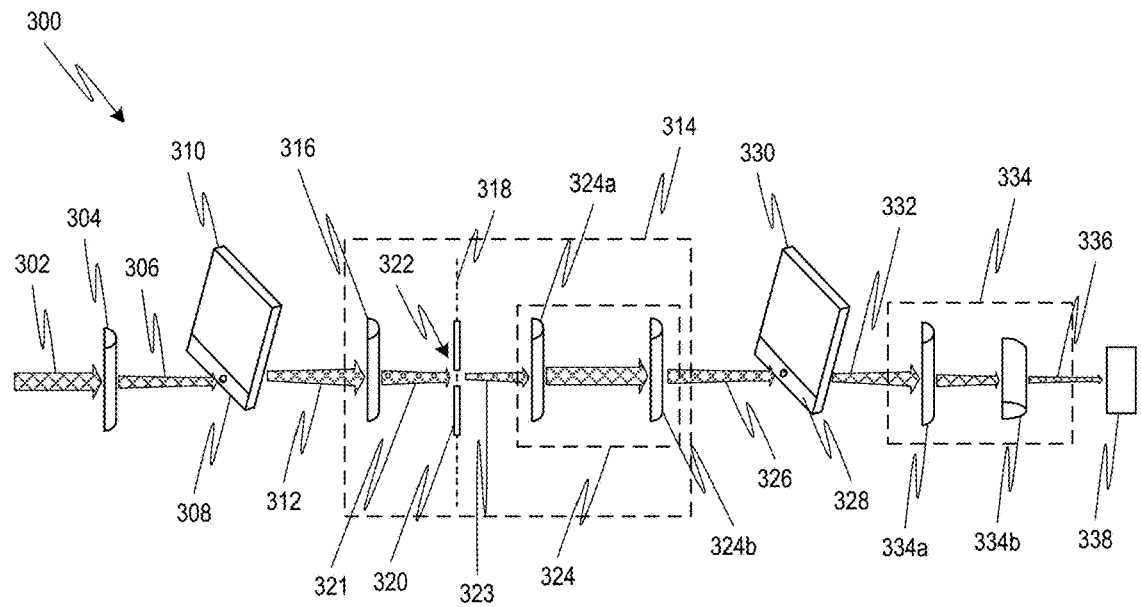
FIG. 3A illustrates an exemplary arrangement of virtually imaged phase array (VIPA) etalons and optical components for two-stage single-axis parallel spectrometer, according to one or more embodiments of the disclosed subject matter.

Based on the generalized configuration of FIG. 2A, a spectrometer 300 as shown in FIG. 3A was built and tested. The spectrometer 300 employed a pair of VIPA etalons 310, 330 as dispersion stages. An optical system 314 was disposed in the optical path between the VIPA etalons 310, 330. The optical system 314 included a focusing lens 316, a mask 320, and a first imaging optical system 324. The first imaging optical system 324 included first and second lenses 324a, 324b (e.g., cylindrical lenses). A second imaging optical system 334 was used to focus an output from the second VIPA etalon 330 onto a CCD detector 338. The second imaging optical system 334 included first and second lenses 334a, 334b (e.g., cylindrical lenses having crossing orientations).

In the experimental setup of FIG. 3A, incident light 302 from a sample was focused by a first focusing lens 304 (e.g., cylindrical lens) to form an input beam 306 directed at input window 308 of VIPA etalon 310. The VIPA etalon 310 separated the input beam 306 into its different spectral components at different angles. After the VIPA etalon 310, focusing lens 316 transforms the angular separation into a spatial separation at its focal plane 318. At focal plane 318, a spatial mask 320 having a central aperture 322 was inserted to remove a part of the spatially-separated spectrum from focused beam 321, thereby forming processed beam 323. The set of two lenses 324a, 324b then imaged the plane of the mask 320 onto input window 328 of second VIPA etalon 320 (e.g., as input beam 326). As a result, a portion of the spectral components separated by the first VIPA etalon 310 are input into the second VIPA etalon 320, with the dispersion axes of the VIPA etalons 310, 320 being the same (i.e., substantially parallel to each other). After the second VIPA etalon 328, focusing optics 334 transformed the angular separation of spectral components in output beam 332 into a spatial separation (e.g., as output beam 336) of a CCD 338. The CCD 338 was used to perform overall quantification of intensity of light at each spectral channel.

Figure 3B:
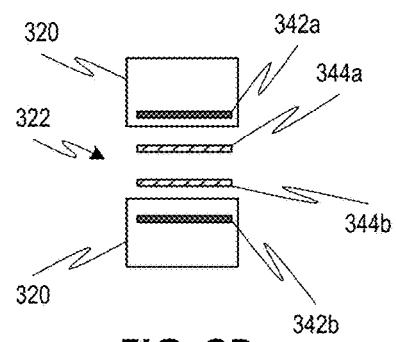
FIG. 3B illustrates operation of the spatial filter in FIG. 3A with respect to certain spatially-separated spectral components.

As noted above, optical system 314 between successive dispersion stages 310, 330 is designed to remove at least a subset of the spectral components to improve spectral extinction. In the optical system 314 of FIG. 3A, this is accomplished by virtue of mask 320 disposed at focal plane 318 as well as the limited input window 328 of the second stage VIPA etalon 330. For example, as illustrated in FIG. 3B, the construction and arrangement of the mask 320 may be such that spectral lines 342a, 342b (e.g., dominant or undesirable wavelengths) are blocked by the mask 320 while spectral lines 344a, 344b are allowed to pass through aperture 322 of mask 320. The spatial mask 320 thus acts as a square band-pass spectral filter of variable bandpass width. Ideally, only the undesirable spectral components 342a, 342b would be cut off to minimize the reduction of bandwidth; however, the bandpass width may be larger to maximize extinction in practical applications.

Moreover, since the second stage etalon 330 has a limited input window 328 and a limited angular acceptance, when the spectrum in plane 318 is imaged onto the input window 328, the second stage etalon 330 input effectively acts as another band-pass "spectral filter." The magnification of the imaging system 324 (or the transmission properties of an equivalent non-imaging system), the separation of the spectral lines in plane 318, and/or the input numerical aperture into the second etalon 330 can be used to adjust the bandwidth of this "spectral filter" for optimal spectral extinction.

It is to be noted that the illustration in FIG. 3B is simplified, and that practical embodiments may include additional spectral components and/or a different spatial separation than what is illustrated. However, the four illustrated spectral components 342a, 342b, 344a, 344b may be particularly useful in the description of the spectrometer 300, since measurement of weak spectral components 344a, 344b adjacent to dominant spectral components 342a, 342b can often occur, for example, in the measurement of Brillouin scattered light, Raman or Rayleigh-wing scattered or fluorescence light signals. For example, FIG. 3B replicates the experimental scenario of two lines coming from a dominant spectral component at two adjacent diffraction orders 342a, 342b respectively, and two lines coming from the weak spectral components 344a, 344b (e.g., Stokes from one diffraction order, 344a, and anti-Stokes from the other order, 344b).

Figure 4A:
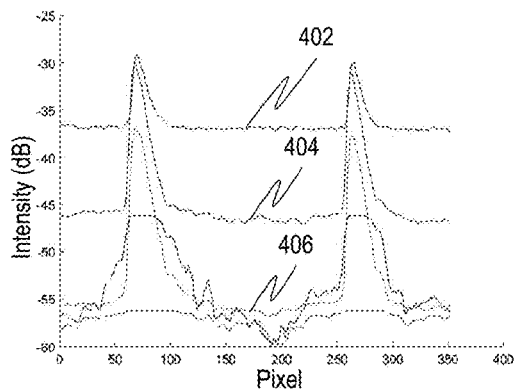
FIG. 4A is a graph of spectral intensity values measured using single-axis parallel spectroscopy employing single stage, two stage, and three stage configurations, according to one or more embodiments of the disclosed subject matter.

In the experimental setup of FIG. 3A, the overall bandwidth of spectrometer 300 has been quantified to be greater than 10 GHz (at FWHM), i.e., more than half of the free spectral range of the spectral dispersive elements, which is sufficient to perform parallel high-resolution spectroscopy and is otherwise approaching the limit imposed by signals of positive and negative spectral shifts. The experimental setup of FIG. 3A was able to achieve overall throughput of ~50% (~70% per stage), which compares well with conventional cross-axis configurations. FIG. 4A shows spectral output obtained for a three-stage spectrometer setup similar to FIG. 3A after the first stage 402, after the second stage 404, and after the third stage 406. The experimental data of FIG. 4A demonstrates spectral extinction of 59.2 dB (e.g., 30 dB for first stage and 29.2 dB for second stage), which replicates performances typical of conventional cross-axis cascading.

One advantage of the disclosed single-axis configurations over conventional cross-axis configurations is in the linewidth of the overall spectrometer. Because cross-axis cascading disperses the spectrum in two-dimensions, the linewidth of an ideal spectral line is spread diagonally and increases by a factor of √2 compared to a single-stage dispersion. Thus, the instrumental linewidth in the multistage cross-axis configuration will always degrade the instrumental linewidth as compared to a single constituent dispersive element (e.g., exceeding 40% worse than that of the single dispersive element). In contrast, the disclosed single-axis configurations can achieve linewidths substantially narrower and indeed approach the linewidth performance of a single constituent dispersive element. For example, in some embodiments, a two or more stage parallel spectrometer according to the single-axis configuration can achieve a linewidth that is no more than 20% worse than that achieved using a single dispersion stage.

Figure 4B:
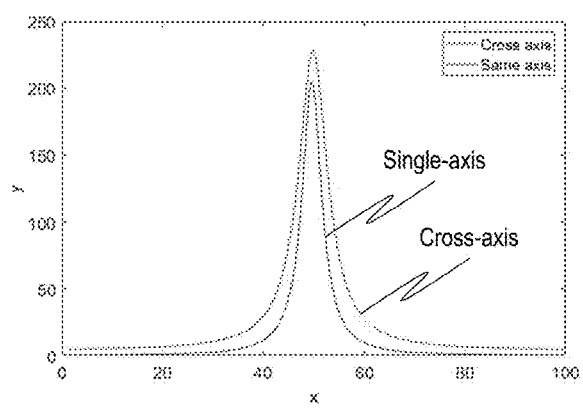
FIG. 4B is a graph comparing spectral intensity values measured using single-axis parallel spectrometer of FIG. 3A and using a comparable two-stage cross-axis parallel spectrometer.

For example, FIG. 4B illustrates experimental results obtained using a single-axis parallel spectrometer 300 according to the setup of FIG. 3A versus a conventional cross-axis spectrometer. As illustrated in FIG. 4B, the linewidth of the single-axis configuration is narrower than an equivalent cross-axis configuration by ~44%, close to theoretical expectations. This is an important improvement as the instrumental spectral linewidth a influences the spectral precision v of the spectrometer. For example, the spectral precision can be given by $v=\sigma/\sqrt{N}$, where N is the number of photons in the spectral component to be analyzed. Thus, a reduction of spectral linewidth by 44% translates into an equivalent increase of spectral precision, which would otherwise require doubling the number of photons measured. Different or improved results may be achieved by optimization of optical components, optical coupling, and/or optical layouts, as known in the art.

In some embodiments, the same dispersive element can be used for multiple dispersion stages. In such embodiments, an optical system is used to redirect (i.e., recirculate) the output after one pass through the dispersive element back to the input of the same dispersive element for a subsequent pass. This redirection can be achieved using a variety of optical components, such as but not limited to polarized light managements components (e.g., polarizing beam splitter, half-wave plates, etc.) and reflective elements (e.g., mirrors). The optical components of the optical system can also include elements to improve spectral extinction, e.g., spatial filters and imaging systems as described above.

Figure 5:
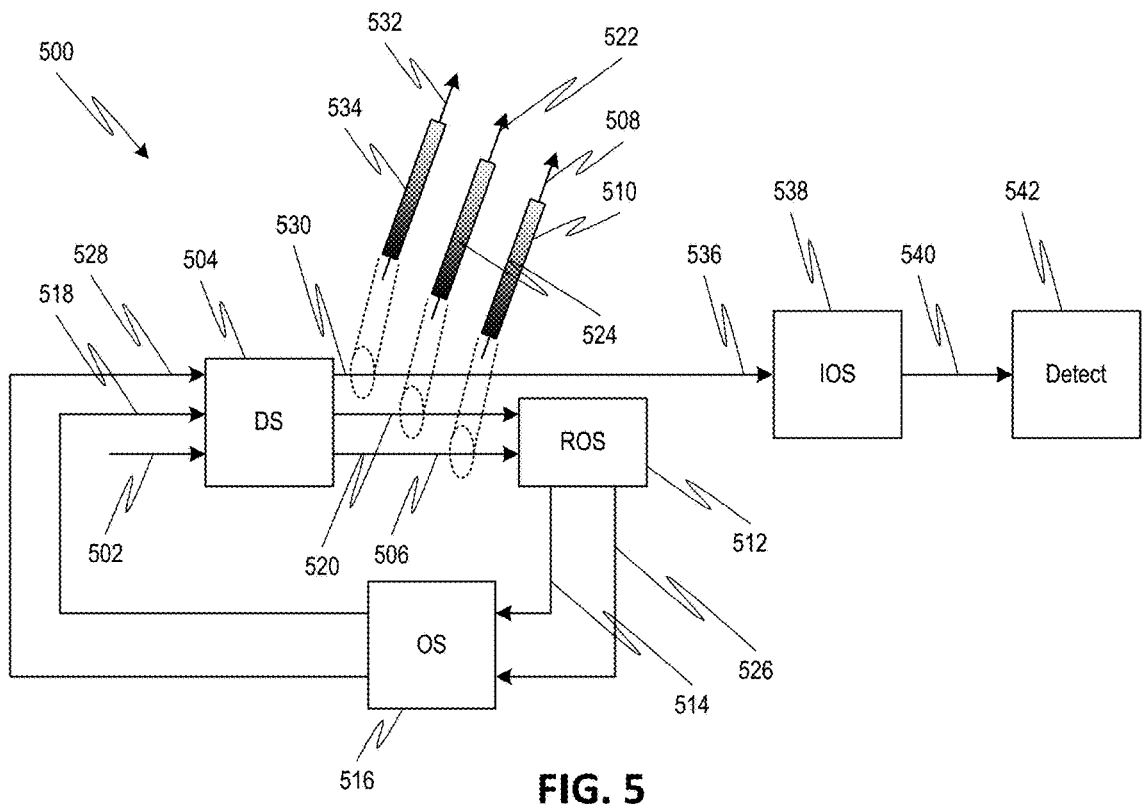
FIG. 5 is a simplified schematic diagram of a generalized optical system for single-axis multi-stage parallel spectroscopy employing recirculation to reduce the number of dispersive elements, according to one or more embodiments of the disclosed subject matter.

Referring to FIG. 5, a simplified configuration of a three-stage recirculating parallel spectroscopy system 500 is illustrated. The system 500 can include a single spectral dispersion stage 504. Input radiation 502 can be directed dispersion stage 504 for a first pass. The first pass through the dispersion stage 504 processes the input radiation 502 to yield first output 506. In particular, the first pass processing separates the input radiation 502 into its spectral components 510 along first dispersion axis 508.

The output beam 506 from the dispersion stage 504 is processed by a recirculating optical system 512 and redirected back to the dispersion stage 504 via optical system 516 for a second pass. Although not specifically shown, recirculating optical system 512 may also include components downstream of optical system 516, for redirecting output thereof. The optical system 516 processes redirected first pass output beam 514 and directs second input beam 518 to dispersion stage 504 for a second pass. Optical system 516 may have components and perform functions similar to those described above for optical system 114 of FIG. 1A. Although shown as separate components, the recirculating optical system 512 and optical system 516 can be integrated together as a single system and/or share common optical components.

The second pass through the dispersion stage 504 processes the input radiation 518 to yield second output 520. In particular, the second pass processing separates the input radiation 518 into its spectral components 524 along second dispersion axis 522, which is substantially parallel to the first dispersion axis 508. The second output beam 520 from the dispersion stage 504 is processed by the recirculating optical system 512 and is again redirected back to the dispersion stage 504 via optical system 516 for a third pass. Thus, the optical system 516 processes redirected second pass output beam 526 and directs third input beam 528 to dispersion stage 504 for a third pass.

For example, the recirculating optical system 512 can be implemented using two or more mirrors, or via an equivalent optical system. To improve spectral extinction, the optical system 516 (or optical system 512 when combined with optical system 516) can include optical elements (e.g., a filter element) that filter out or remove certain undesirable spectral components from beams 514, 526, such that input beams 518, 528 include only a subset of desired spectral components (e.g., having more than one wavelength). Alternatively or additionally, the optical system 516 can prevent the undesirable spectral components in beams 514, 526 from being re-input to the dispersion stage 504, for example, by redirecting those components in beams 518, 528 along a path that is outside the numerical aperture for input to dispersion stage 504. For example, the optical system 516 and/or recirculating optical system 512 can have a magnification/demagnification system that adjusts the output spectrum from the $n^{th}$ pass, in order to optimize or inhibit/attenuate a certain part of the spectrum in the $(n+1)^{th}$ dispersive iteration. The optical system 516 and/or recirculating optical system 512 can include various optical components, such as but not limited to optical filters (e.g., longpass filter, shortpass, filter, bandpass filter, or spatial filters such as masks (e.g., slits or pinholes)) and imaging systems (e.g., lenses, mirrors, etc.). The removal of a portion of the spectrum can increase spectral extinction without sacrificing throughput and parallel spectroscopic operation.

The third pass through the dispersion stage 504 processes the third input radiation 528 to yield third output 530. In particular, the third pass processing separates the third input radiation 528 into its spectral components 534 along third dispersion axis 532, which is substantially parallel to the first and second dispersion axes 508, 522. The output beam 530 from the dispersion stage 504 can be input at 536 to an imaging optical system 538, which outputs a focused beam 540 onto a detection surface of detector 542 for measurement. For example, the recirculating optical system 512 can allow the third pass output beam 530 to pass for detection by appropriate placement of a redirecting optical components, where each of the outputs 506, 520, 530 is spatially offset from each other.

Although three passes (two recirculations) are illustrated in FIG. 5, additional or fewer passes (and corresponding recirculations) are also possible according to one or more embodiments. For example, each input 502, 518, 528 can be spatially offset from each other on an input window of the dispersion stage 504. The possible number of passes may thus be a function of the size of the input window, the spot size for each input, and the spacing necessary between input spots to avoid crosstalk between adjacent spots, but is otherwise unlimited by configuration of the system. The recirculating optical system 512 can be appropriately resized such that only the ultimate pass output is sent for detection while all other outputs from the dispersion stage 504 are redirected back to its input for subsequent passes.

Figure 6A:
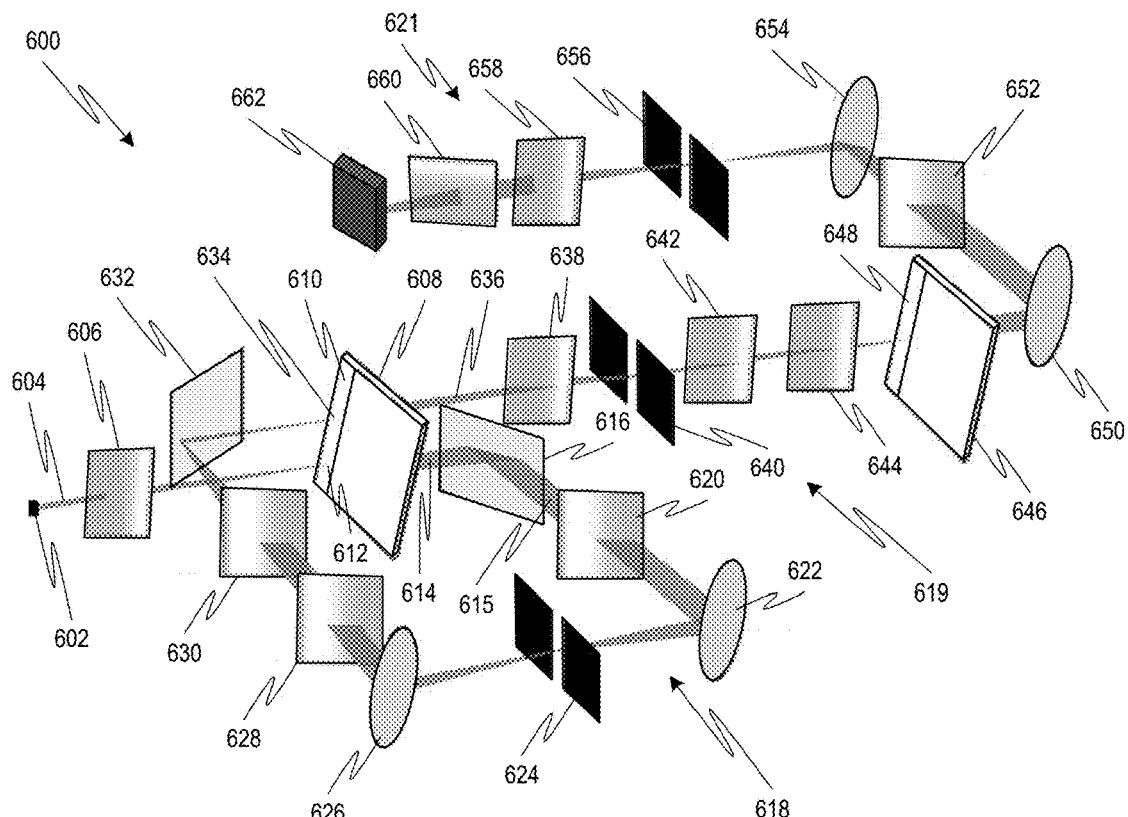
FIG. 6A illustrates a simplified exemplary arrangement for three-stage single-axis parallel spectrometer employing two dispersive elements, according to one or more embodiments of the disclosed subject matter.

FIG. 6A illustrates a fabricated example of a three-stage single-axis parallel spectrometer 600, which has a single dispersive element 608 providing two passes via recirculation to serve as first and second dispersion stages, cascaded with a subsequent single dispersive element 646 as a third dispersion stage. The combination of different dispersion stages with different numbers of recirculations (e.g., one for element 608 and zero for element 646) may be used to maximize, or at least improve, performance parameters such as resolution, spectral extinction, and/or effective throughput.

In spectrometer 600, input radiation 602 is focused by a cylindrical lens 606 onto a first location 612 at an input window 610 of a first dispersive element 608. The first dispersive element 608 processes the radiation and generates an output beam 614 that has spectral components separated along a first dispersion axis. The output pattern 614 enters a recirculation path 615 via a mirror 616. The radiation from mirror 616 is then focused by a cylindrical lens 620 onto a slit 624 via a mirror 622. As with previous embodiments, the slit 624 is disposed at a focal plane of the cylindrical lens 620 and is aligned to allow only part of the spectrum to pass through. The output from the slit 624 is reflected by mirror 626 to a cylindrical lens 628 that re-collimates the beam. An additional cylindrical lens 630 then focuses the recollimated beam, via another mirror 632, onto second location 634 at the input window 610 of the dispersive element 608. The path of output light 614 recirculated back to the input window 610 can be such that the second input beam at 634 is spaced from and substantially parallel to the original input beam at 612. Elements 616, 622, 626, and 632 may be considered part of a recirculating optical system, while elements 620, 624, 628, and 630 may be considered part of the optical system that filters part of the spectrum. Together with dispersive element 608, elements 616, 620-632 may be considered to form a recirculating stage 618 that provides two cascaded single-axis dispersion stages.

The first dispersion element 608 processes the recirculated radiation input at 634 and generates a second output beam 636 that has spectral components separated along a second dispersion axis, which is substantially parallel to the first dispersion axis. The location of the output beam 636 allows the beam 636 to bypass recirculation by avoiding reflection by mirror 616, thereby continuing to the next cascaded stage, i.e., third dispersion stage 646. An optical system 619 is provided between recirculating stage 618 and the third dispersion stage 646 and can offer many of the same functions as described above with respect to the other single-axis parallel spectroscopy embodiments. For example, optical system 619 can include a focusing cylindrical lens 638, second slit 640, and a pair of imaging lenses 642, 644. The cylindrical lens 638 focuses radiation beam 636 onto second slit 640, which is disposed at a focal plane of the cylindrical lens 638 and operates to block part of the spectrum from passing therethrough. The output from the slit 640 passes to cylindrical lens 642, which re-collimates the beam, and then to cylindrical lens 644, which focuses the beam onto input window 648 of the second dispersive element 646.

The second dispersive element 646 (acting as the third dispersion stage in the cascade of spectrometer 600) further processes the radiation to generate another output beam, which can then be imaged onto a detector 662 via an imaging system 621 comprised of cylindrical lenses 658, 660 arranged at orthogonal angles. Optionally, a pair of mirrors 650, 654 and an intervening focusing cylindrical lens 652 can be used to redirect the beam in order to reduce a footprint of the spectrometer 600. A third slit 656 may be disposed at a focal plane of the cylindrical lens 652. The third slit 656 can operate to block a part of the spectrum from passing therethrough. Alternatively, the third slit 656 may operate differently than the first slit 624 and second slit 640 by merely operating to block stray light.

The radiation paths input at 612 and 634 to the etalon 608 are not overlapped with each to minimize cross-talk. Moreover, the radiation paths can be substantially parallel to each other. For example, although the radiation input beams are separated, the incident angle in the VIPA etalon 608 of both beams may be the same in some embodiments. In such embodiments, the output of the VIPA etalon 608 from the first two dispersion stages can be tuned by simply adjusting the tilt of the single VIPA etalon 608.

In an experimental setup employing a spectrometer according to FIG. 6A, a 532 nm CW laser was coupled into a single mode fiber as light source, and two VIPA etalons were used as dispersive elements 608, 646. In particular, a VIPA etalon with free spectral range of 17 GHz was chosen as element 608, and a VIPA etalon with free spectral range of 20 GHz was chosen as element 646. In the experimental setup, mirrors (e.g., elements 616, 622, 626, 632) were used to implement the recirculation path. However, similar functionality can be achieved using other optical components, such as by using beam steering elements or polarization controlling elements.

Figure 7A:
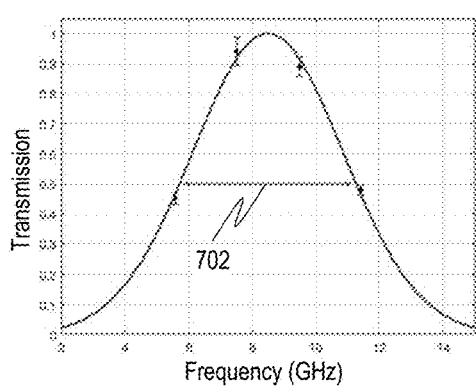
FIG. 7A is a frequency response curve of measured intensity of a Brillouin frequency shift obtained using a spectrometer according to the arrangement of FIG. 6A.
Figure 7B:
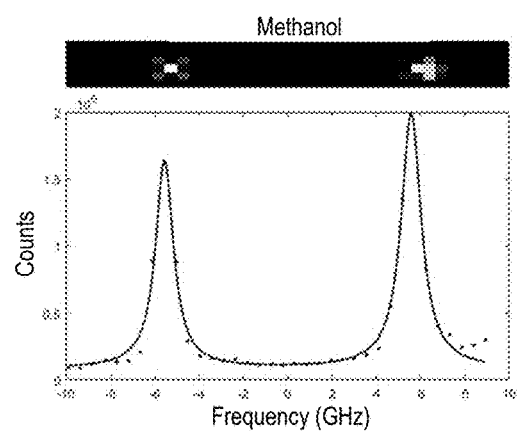
FIG. 7B is a graph of spectral intensity values for Brillouin measurements of methanol obtained using a spectrometer according to the arrangement of FIG. 6A.
Figure 7C:
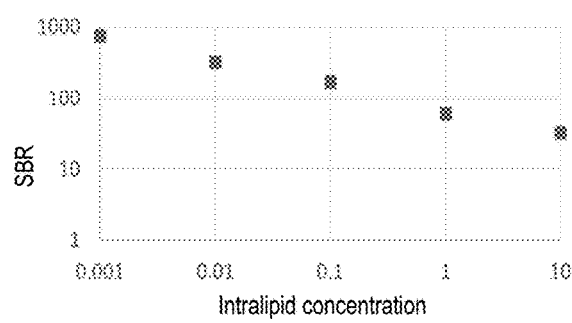
FIG. 7C is a graph of signal-to-background ratio (SBR) versus intralipid concentration for Brillouin measurements of intralipid solutions using a spectrometer according to the arrangement of FIG. 6A.

The effective throughput and the frequency bandwidth of the spectrometer 600 was characterized. The throughput at etalon 646 was shown to be about 10%, which is ~50% greater than the throughput obtained by a conventional three-stage spectrometer employing a cross-axis configuration. Further device performance of spectrometer 600 is illustrated in FIGS. 7A-7C. FIG. 7A shows a frequency response curve obtained by measuring intensity of Brillouin frequency shift. Assuming a Gaussian envelope, the full-width-half-maximum (FWHM) 702 of the curve in FIG. 7A yields a value of 5.56 GHz. The FWHM can be influenced by focusing angle of the beam entering each etalons 608, 646, as well as by respective opening widths of slits 624, 640, 656. The spectrometer 600 was used characterize the Brillouin spectrum of methanol, as illustrated in FIG. 7B. The two-peak profile obtained by detector 662 was fitted with a double Lorentzian function, and the resulting linewidth was measured as 0.56 GHz. Under these experimental conditions, the spectral extinction performance was also measured, yielding 56 dB for the first two stages (e.g., after recirculation stage 618), and 23 dB for the last stage (e.g., after etalon 646). Signal-to-background (SBR) ratio of spectrometer 600 was further evaluated using intralipid solutions at different concentrations. As illustrated in FIG. 7C, even at 10% intralipid concentration, the spectrometer 600 achieves a signal tenfold greater than the background. Effective throughput and spectral extinction performances can be improved with an optimization of the beam focusing in the dispersive elements 608, 646, as well as with the use of additional filtering elements, such as but not limited to VIPA apodization, etalon or interferometric filters, and/or spectral coronography.

Figure 6B:
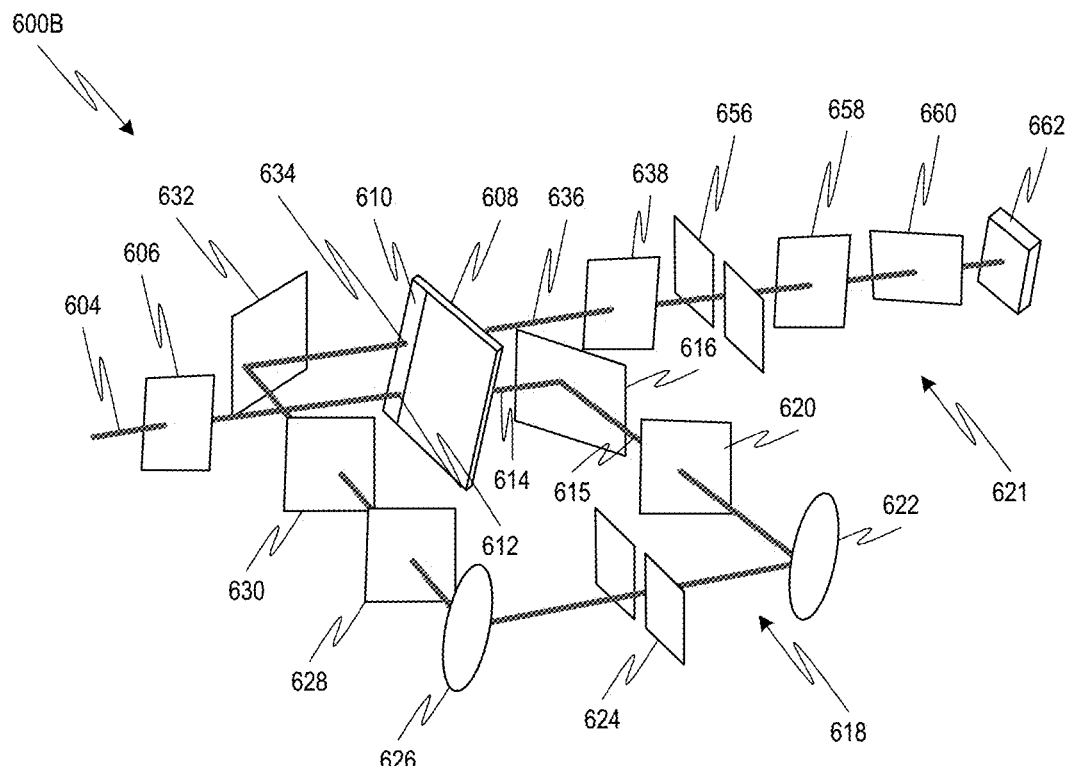
FIG. 6B illustrates a simplified exemplary arrangement for a two-stage single-axis parallel spectrometer employing a single dispersive element, according to one or more embodiments of the disclosed subject matter.

Although FIG. 6A combines a two-pass recirculation stage with a subsequent single pass dispersion stage, embodiments of the disclosed subject matter are not limited thereto. Rather, in some embodiments, the two-pass recirculation stage 618 can be used alone without any further dispersion stages. For example, FIG. 6B illustrates a two-stage single-axis parallel spectrometer 600B that is similar to the spectrometer 600 of FIG. 6A but lacks the second dispersive element 646 and associated optical components. Thus, output beam 636 is focused by cylindrical lens 638, passes through slit 656 disposed at the focal plane of cylindrical lens 638, is recollimated by cylindrical lens 658 of imaging system 621, and is then focused on the detector 662 by orthogonally oriented cylindrical lens 660 of imaging system 621.

Figure 6C:
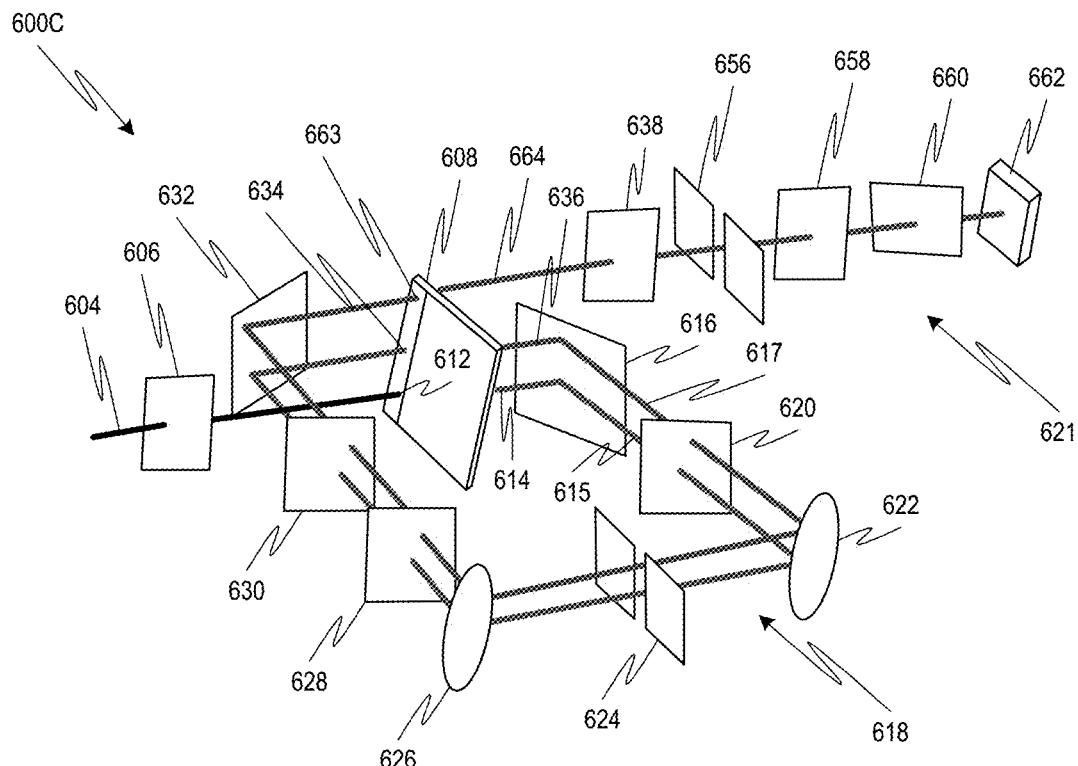
FIG. 6C illustrates a simplified exemplary arrangement for a three-plus-stage single-axis parallel spectrometer employing a single dispersive element, according to one or more embodiments of the disclosed subject matter.

Although FIGS. 6A-6B each illustrate recirculation with two passes through same dispersion element 608, embodiments of the disclosed subject matter are not limited thereto. Rather, the setup of FIG. 6B can be modified such that all three (or more) dispersion stages of FIG. 6A occur on the same etalon, for example, as shown in FIG. 6C. Thus, second output beam 636 is instead reflected by mirror 616 along recirculation path 617 similar to first output beam 614. The second output beam 636, as modified by the optical components 620-632 along the recirculation path 617, is then focused onto location 663 at the input window 608. The first dispersion element 608 processes the recirculated radiation input at 663 and generates a third output beam 664 that progresses to the detector 662 in a manner similar to that described above for output beam 636 in FIG. 6B. Although it is possible to align three or more dispersive stages on the same etalon as in FIG. 6C, in some embodiments the choice of two separate dispersive elements as in FIG. 6A may allow for optimization of the first two stages (dispersed by element 608) as frequency filters, and the third stage (dispersed by element 646) as a pure dispersive stage.

In some embodiments, the same dispersive element can be used for at least two passes of the radiation (i.e., forming at least two respective dispersion stages of the cascade). Indeed, in some embodiments, a single dispersive element can provide an arbitrary number of passes (and corresponding arbitrary number of dispersion stages of the cascade) by appropriate design of the recirculation and the input window of the dispersive element. Alternatively or additionally, additional single-pass dispersion stages can be provided upstream or downstream from this dispersive element. In such configurations, the multi-pass dispersion stage according to FIG. 5 may be considered to replace one of the single-pass dispersion stages according to FIG. 1A. Alternatively or additionally, additional multi-pass dispersion stages are provided upstream or downstream from the dispersive element. For example, in FIG. 6A, the single pass dispersion stage (formed by etalon 646) can be replaced with the multi-pass dispersion stage 618 (including etalon 608), or vice versa. Other contemplated variations include, but are not limited to, the use of dispersive elements of different nature (e.g., diffraction grating, VIPA etalon) in different dispersion stages in FIGS. 3A, 6A, the recirculation of radiation after it passes through two different dispersive elements (e.g., by relocating mirror 616 to after the output of dispersive element 646 in FIG. 6A), and/or the use of alternative frequency filtering elements (e.g., gas chambers, Fabry-Perot interferometers, etc.) in place of one or more of the slits in FIGS. 3A, 6A-6C.

Figure 8A:
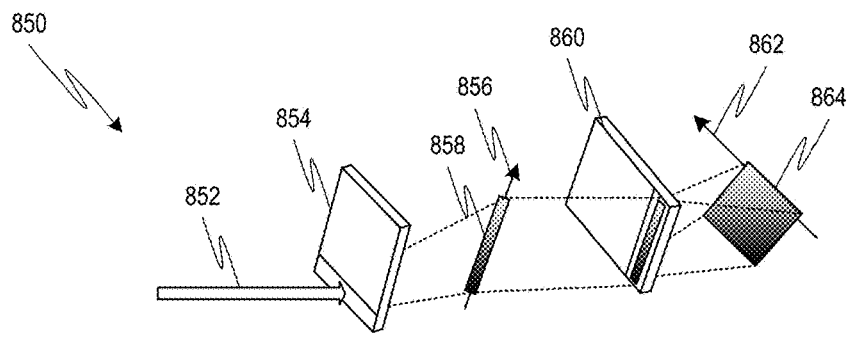
FIG. 8A illustrates a simplified exemplary arrangement of dispersive elements for two-stage cross-axis parallel spectroscopy.

The concept of radiation recirculation through the same dispersive element to provide the same effect as cascaded dispersion stages can also be applied to conventional cross-axis cascading configurations. In a two-stage cross-axis VIPA spectrometer 850, radiation is independently dispersed on two spatial axes. For example, as shown in FIG. 8A, the input radiation 852 is focused in the first etalon 854 to generate an output pattern 858 along a first dispersion axis 856. The output pattern 858 is then focused on the orthogonal axis into a second etalon 860, which is mounted perpendicularly to the first etalon 854 and generates an output pattern 864 with spectral components separated along a second dispersion axis 862. The resulting pattern 864 can then be imaged onto an appropriate detector.

Figure 8B:
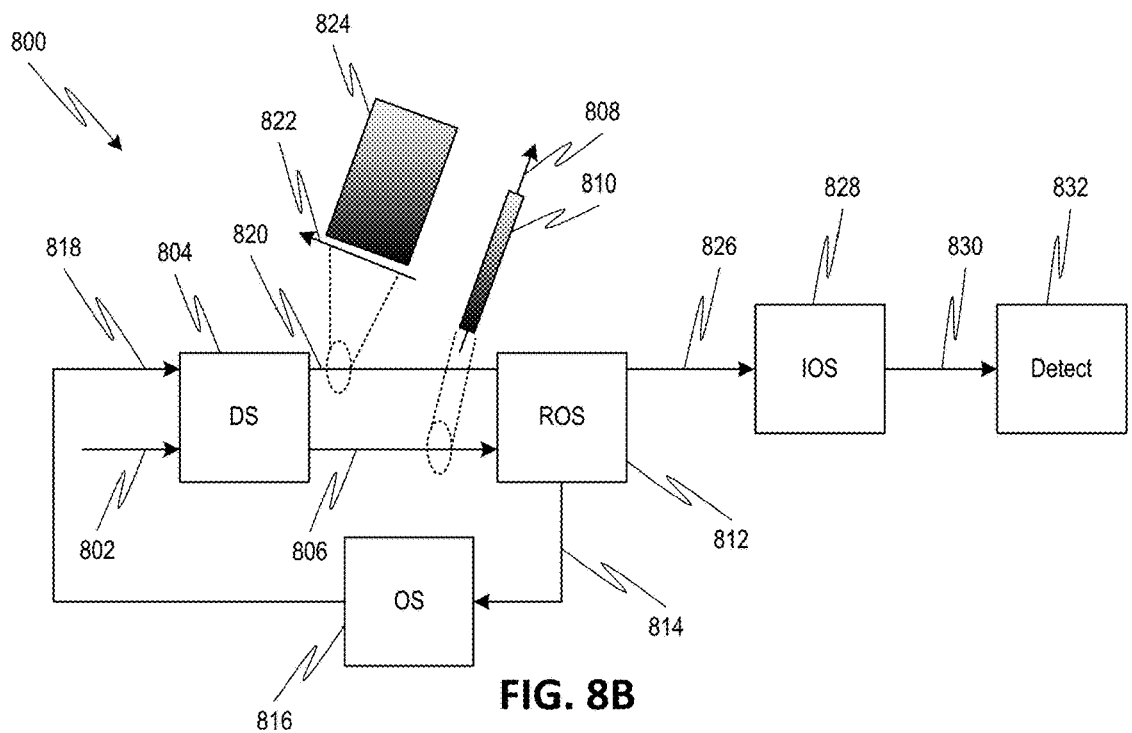
FIG. 8B is a simplified schematic diagram of a generalized optical system for cross-axis multi-stage parallel spectroscopy employing recirculation to reduce the number of dispersive elements, according to one or more embodiments of the disclosed subject matter.

To achieve the same effect as spectrometer 850, spectrometer 800 employs a recirculation path that allows the radiation to be dispersed twice by the same dispersion stage but on different spatial axes. As shown in FIG. 8B, input radiation beam 802 is focused onto dispersion stage 804 for a first pass. The first pass through the dispersion stage 804 processes the radiation to yield first output beam 806. In particular, the first pass processing separates the input radiation 802 into its spectral components 810 along first dispersion axis 808.

The output beam 806 from the dispersion stage 804 is processed by a recirculating optical system 812 and redirected along recirculation path 814 back to the dispersion stage 804 via optical system 816 for a second pass. Although not specifically shown, recirculating optical system 812 may also include components downstream of optical system 816, for redirecting output thereof. Although shown as separate components, the recirculating optical system 812 and optical system 816 can be integrated together as a single system and/or share common optical components.

The second pass through the dispersion stage 804 processes the input radiation 818 to yield second output 820. In particular, the second pass processing separates the input radiation 818 into its spectral components 824 along second dispersion axis 822, which is orthogonal to or at least crossing the first dispersion axis 808. The output beam 820 from the dispersion stage 804 is processed by a recirculating optical system 512 and can be directed at 826 to an imaging optical system 828, which outputs a focused beam 830 onto a detection surface of detector 832 for measurement.

The recirculating optical system 812 can be designed as a radiation folding architecture that allows the radiation to be dispersed twice by the same dispersion stage 804 but on two different spatial axes 808, 822. For example, the dispersion on the second dimension 822 can be accomplished by rotating the output pattern 806 by 90° using one or more beam steering elements. The rotated pattern is then focused onto the input window of the dispersion stage 804 to produce an output pattern 824 that is otherwise equivalent to pattern 864 produced by conventional cross-axis configuration 850.

Thus, when applied to cross-axis configurations, the recirculation concept may produce similar spectral separations while reducing the overall size of the instrument and the number of dispersive elements required.

Figure 9:
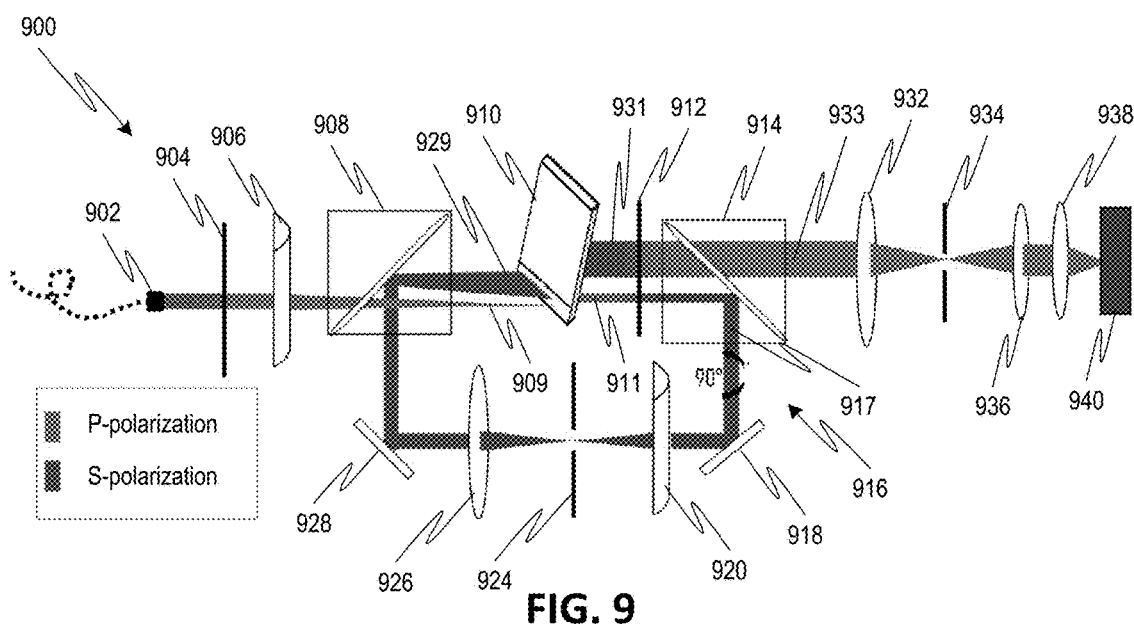
FIG. 9 illustrates a simplified exemplary arrangement for two-stage cross-axis parallel spectroscopy employing a single dispersive element, according to one or more embodiments of the disclosed subject matter.

FIG. 9 illustrates a fabricated example of a two-stage cross-axis parallel spectrometer 900, which has a single dispersive element 910 providing two passes via recirculation to serve as two dispersion stages. In the spectrometer 900, linearly polarized radiation input at 902 passes through a first half-wave plate 904 such that the beam becomes p-polarized. The beam is then focused by a cylindrical lens 906 onto a first polarizing beam splitter (PBS) 908, which transmits the p-polarized beam 909 as input to VIPA etalon 910. The VIPA etalon 910 processes the input radiation and generates output beam 911 that has spectral components separated along a first dispersion axis. The output pattern 911 passes through a second half-wave plate 912 oriented perpendicular to first half-wave plate 904, such that the beam 911 changes to s-polarized. This s-polarized radiation beam is reflected by a second PBS 914, thereby entering a recirculation path 917. In the recirculation path 917, the output pattern is rotated 90° by a beam steering system 916 constituted by mirrors 918, 928. Mechanisms for achieving pattern rotation via beam steering other than the illustrated mirrors 918, 928 are also possible according to one or more contemplated embodiments. For example, the beam steering system 916 can include a Dove prism oriented at 45°.

The output pattern can be focused by a cylindrical lens 920 onto a slit 924, which is disposed at a focal plane of the cylindrical lens 920 and may serve as a spatial filter. However, unlike single-axis configuration, slit 924 in cross-axis configurations is primarily used to reject stray light rather than removing spectral components from the output beam. A spherical lens 926 then focuses the beam output from slit 924 into VIPA etalon 910 for a second time via reflections by another beam steering mirror 928 and by first PBS 908 (by virtue of the switch to s-polarization).

The VIPA etalon 910 processes this s-polarized radiation input 929 and generates output beam 931 that has spectral components separated along a second dispersion axis orthogonal to the first dispersion axis. The output pattern 931 passes through the second half-wave plate 912, such that the beam 931 changes back to p-polarized. This p-polarized radiation beam is transmitted as beam 933 by the second PBS 914. The transmitted beam 933 is then focused by a second spherical lens 932 through a second slit 934 (e.g., used to remove stray light rather than removing or attenuating spectral components) and imaged onto detector 940 by a pair of lenses 936, 938.

The path of output light 911 recirculated back to the input of etalon 910 can be such that the second input beam 929 is spaced from and substantially parallel to the original input beam 909 (e.g., not overlapping and having the same incident angle in the etalon 910). By having the same entrance angle for both beams 909, 929 in the etalon 910, equal dispersive performance can be maintained on both dispersion axes, thereby allowing one-touch fine-tuning capability of the system 900 via manipulation of etalon 910.

In an experimental setup employing a spectrometer according to FIG. 9, a 532 nm CW laser was coupled into a single mode fiber as light source, and a VIPA etalon with free spectral range of 20 GHz was used as the single dispersive element.

Figure 10A:
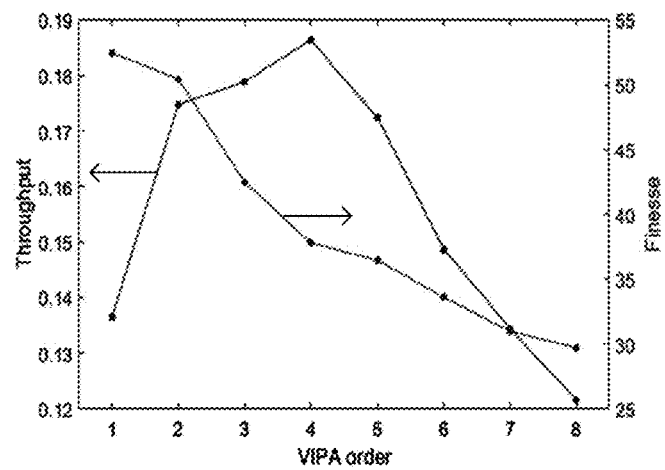
FIG. 10A is a graph of throughput and finesse versus VIPA order for a spectrometer according to the arrangement of FIG. 9.

The effective throughput and finesse as a function of the angle between the incoming beam and the VIPA etalon 910 was measured for system 900, as shown in FIG. 10A. Varying this angle changes the path of light inside the etalon 910, modifying the resulting interference pattern. It is possible to adjust and optimize the entrance angle of the etalon 910 so that a specific interference order is preferred to others in terms of throughput. If the two incident beams enter the VIPA etalon 910 with the same angle, the peak order will be the same on both dispersion axes. Thus, tuning the tilt of the VIPA etalon 910 can simultaneously adjust first and second cascaded stages of the spectrometer 900. As shown in FIG. 10A, a compromise can be achieved between the third and the fourth order, with effective throughput around 18% and finesse of ~40. Note that effective throughput is calculated as the light focused only at a certain order over the overall incident power. The overall throughput, expressed as total output power over total input power, was 23% at peak performance.

Figure 10B:
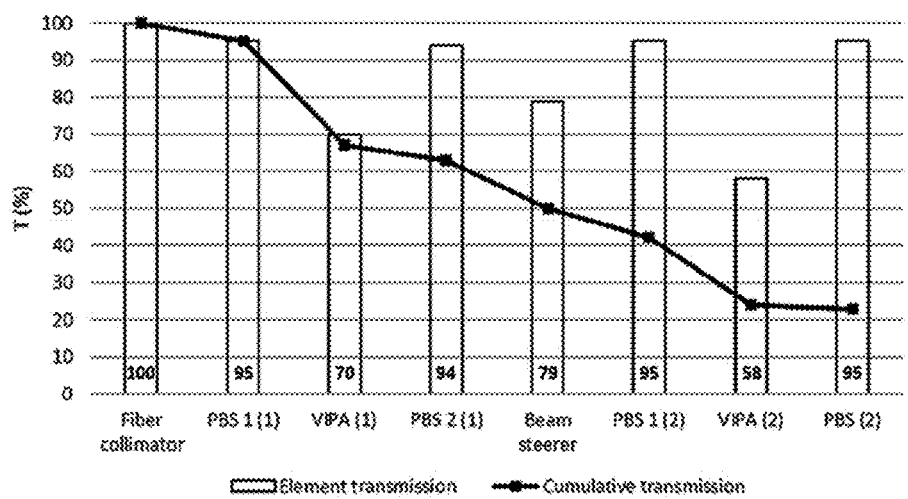
FIG. 10B is a graph illustrating transmission efficiency for various optical elements in a spectrometer according to the arrangement of FIG. 9.

In order to better characterize losses, component level efficiency analysis was made, as shown in FIG. 10B. As indicated by FIG. 10B, polarization alternating components (e.g., 904, 908, 912, 914) have a relatively low efficiency (e.g., ~95% per pass), which leads to an overall 20% loss over four passes. More efficient components or a mirror-based recirculating system may be used to improve the throughput. Moreover, the beam steering components (e.g., 918, 928) also show low efficiency performance (~80%), which may be due to the relatively larger size of the VIPA pattern as compared to the mirror sizes. However, in ideal experimental conditions, there should only be losses due to the VIPA etalon 910, which may yield an overall throughput of ~35%.

Figure 10C:
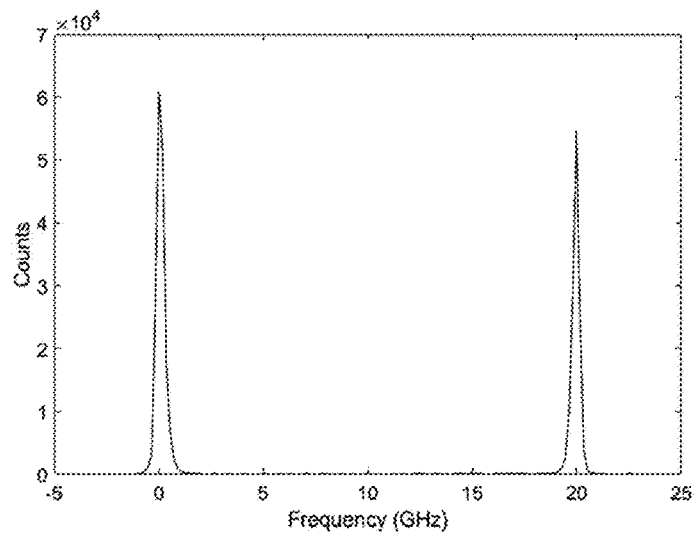
FIG. 10C is a graph of spectral intensity values for Brillouin measurements obtained using a spectrometer according to the arrangement of FIG. 9.
Figure 10D:
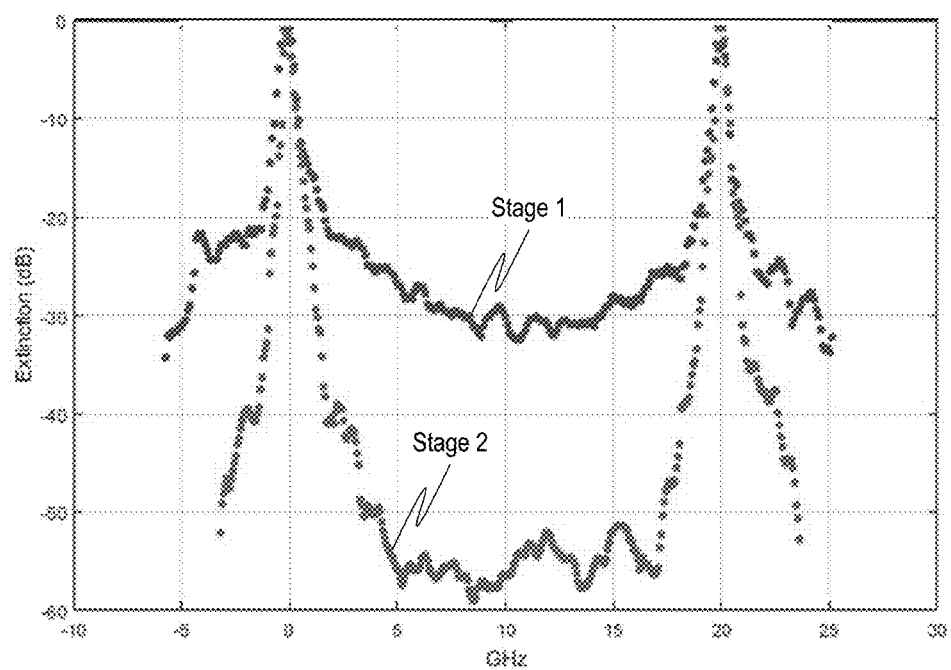
FIG. 10D is a graph comparing spectral intensity values for Brillouin measurements obtained using a spectrometer after only a single dispersion stage (e.g., before recirculation) and using a two-stage spectrometer according to the arrangement of FIG. 9 (e.g., after recirculation).

To evaluate the spectral performance of spectrometer 900, the spectral linewidth and extinction ratio was characterized. Fitting the two-peak profile obtained on the detector 940 with a double Lorentzian function as shown in FIG. 10C, a linewidth of 0.48 GHz was measured. The spectral contrast after the first dispersion stage (e.g., first pass through etalon 910) and second dispersion stage (e.g., second pass through etalon 910) were also measured and is shown in FIG. 10D. In particular, in order to quantify the performance at the first stage, the orientation of the second half wave plate 912 was temporarily changed to let beam 911 pass to the detector 940 without recirculation. The second stage measurement was performed with recirculation enabled per the configuration in FIG. 9. This ability to visualize either one or two stages on the detector 940 may be useful during setup of system 900, for example, during alignment or characterization.

As shown in FIG. 10D, the spectrometer 900 yields an extinction of ~58 dB, comparable with a conventional two-stage cross-axis spectrometer. Other optical elements can be added to spectrometer 900 to further improve extinction, for example, VIPA apodization, etalon or interferometric filters, and/or spectral coronography. For example, apodization filters can be placed after the two exit sides of the second PBS 914.

Alternatively or additionally, a coronography can be implemented between the 936 and 938.

Although specific system configurations and methods for multi-stage parallel spectroscopy have been discussed above, embodiments of the disclosed subject matter are not limited thereto. Rather, various combinations of the above described components as a single-axis cascade of identical or different dispersive elements to perform parallel spectroscopy are possible according to the teachings of the present disclosure. For example, spectroscopy embodiments according to the disclosed subject matter can include: two VIPA etalons with different free spectral ranges; a Fabry-Perot etalon in tilted configuration and a VIPA etalon; a VIPA etalon and a diffraction grating; or any other combination of dispersive elements where the dispersion axes are substantially parallel. The use of recirculation can also enable different combinations of dispersive stages, including but not limited to cascading one multi-pass etalon with a single-axis etalon in a combined cross-axis system (e.g., by combining features of FIG. 8B with FIGS. 1A and/or 5).

Embodiments of the disclosed subject matter can improve instrument precision in spectral analysis, reduce instrument footprint, and/or enable multi-pass cascade spectroscopy using a single dispersive element in which light is recirculated. Although the disclosed embodiments may find particular utility to spectrometers and spectrometry methods, the teachings of the present disclosure can be readily utilized in any system where spectral separation is required, such as but not limited spectral filtering, spectral modulation and other forms of spectral processing known in the art.

Although some of the embodiments described above refer to "imaging," the production of an actual image is not strictly necessary. Indeed, the mentions of "imaging" are intended to include the acquisition of data where an image may not be produced.

Accordingly, the use of the term "imaging" herein should not be understood as limiting.

Although particular optical components and configuration have been illustrated in the figures and discussed in detail herein, embodiments of the disclosed subject matter are not limited thereto. Indeed, one of ordinary skill in the art will readily appreciate that different optical components or configurations can be selected and/or optical components added to provide the same effect. In practical implementations, embodiments may include additional optical components or other variations beyond those illustrated, for example, additional reflecting elements to manipulate the beam path to fit a particular microscope geometry. Accordingly, embodiments of the disclosed subject matter are not limited to the particular optical configurations specifically illustrated and described herein.

It will be appreciated that the aspects of the disclosed subject matter, for example, the control system 132 and/or the input/output 134, can be implemented, fully or partially, in hardware, hardware programmed by software, software instruction stored on a computer readable medium (e.g., a non-transitory computer readable medium), or any combination of the above. For example, components of the disclosed subject matter, including components such as a control unit, controller, processor, user interface, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates the transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine-readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

It is thus apparent that there is provided, in accordance with the present disclosure, multi-stage parallel spectroscopy systems and methods. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A parallel spectroscopy system comprising:
   a first dispersion stage constructed to spatially separate radiation input to the first dispersion stage into respective spectral components along a first dispersion axis;
   a second dispersion stage constructed to spatially separate radiation input to the second dispersion stage into respective spectral components along a second dispersion axis; and
   an optical assembly disposed in an optical path between an output of the first dispersion stage and an input of the second dispersion stage, the optical assembly being constructed to direct a first set of wavelengths in the spectral components output from the first dispersion stage to the input of the second dispersion stage,
   wherein the first dispersion axis is substantially parallel to the second dispersion axis, and
   the optical assembly is constructed to attenuate a second set of wavelengths in the spectral components output from the first dispersion stage from input to the second dispersion stage, while allowing the first set of wavelengths to simultaneously pass to the input of the second dispersion stage.

2. The system of claim 1, wherein the first dispersion stage or the second dispersion stage comprises at least one of a diffraction grating, an echelle-type grating, a prism, a Fabry-Perot etalon, or a virtually imaged phased array (VIPA) etalon.

3. The system of claim 1, wherein the optical assembly comprises:
   a focusing lens disposed in the optical path to receive the output of the first dispersion stage; and
   a filter or slit disposed in the optical path at a focal plane of the focusing lens.

4. The system of claim 3, wherein the optical assembly further comprises an imaging optical assembly disposed in the optical path between the filter or slit and the input of the second dispersion stage.

5. The system of claim 4, wherein a numerical aperture of the input of the second dispersion stage, a magnification provided by the imaging optical assembly, a passband of the filter or slit, or a combination thereof is selected to attenuate the second set of wavelengths input to the second dispersion stage.

6. The system of claim 4, further comprising a controller comprising a processor and non-transitory computer-readable storage medium storing computer-readable instructions that, when executed by the processor, cause the processor to control an adjustable passband of the filter or slit to change wavelengths associated with the first set passed to the input of the second dispersion stage.

7. The system of claim 1, comprising:
   a detector comprising an array of radiation detecting pixels; and a second optical assembly disposed in a second optical path between an output of the second dispersion stage and the detector, the second optical assembly being constructed to focus spatially-separated spectral components onto the array of the detector, wherein the parallel spectroscopy system is configured as a Brillouin light scattering spectrometer, a Raman scattering spectrometer, a Rayleigh-wing scattering spectrometer, a Raman fluorescence spectrometer, or a Rayleigh-wing fluorescence spectrometer.

8. The system of claim 1, comprising:
a third dispersion stage constructed to spatially separate radiation input to the third dispersion stage into respective spectral components along a third dispersion axis; and
a second optical assembly disposed in a second optical path between an output of the second dispersion stage and an input of the third dispersion stage, the second optical assembly being constructed to direct at least a portion of the spectral components output from the second dispersion stage to the input of the third dispersion stage,
wherein the second dispersion axis is substantially parallel to the third dispersion axis.

9. The system of claim 1, wherein the optical assembly is constructed to redirect the first set of wavelengths in the spectral components output from the first dispersion stage back to the input of the first dispersion stage such that the first dispersion stage serves as the second dispersion stage.

10. The system of claim 9, wherein the optical assembly is constructed such that a beam spot formed by the redirected first set of wavelengths at the input of the first dispersion stage is parallel to and spatially offset from a beam spot formed by radiation originally provided to the input of the first dispersion stage.

11. A method for parallel spectroscopy comprising:
(a) spatially separating input radiation into spectral components along a first dispersion axis;
(b) directing a first portion of the spatially-separated spectral components to a subsequent dispersion stage while filtering out a second portion of the spatially-separated spectral components; and
(c) further spatially separating said first portion along a second dispersion axis;
wherein the first dispersion axis is substantially parallel to the second dispersion axis, and
the directing the first portion simultaneously passes multiple wavelengths to the subsequent dispersion stage.

12. The method of claim 11, wherein:
(a), (c), or both (a) and (c) are performed using one or more dispersion stages, and
each dispersion stage comprises at least one of a diffraction grating, an echelle-type grating, a prism, a Fabry-Perot etalon, or a virtually imaged phased array (VIPA) etalon.

13. The method of claim 11, wherein the filtering out the second portion of (b) comprises using a filter or slit disposed in an optical path between adjacent dispersion stages.

14. The method of claim 13, wherein the directing the first portion of (b) comprises focusing an output from the filter or slit onto an input of the subsequent dispersion stage using an imaging optical assembly.

15. The method of claim 14, further comprising:
(d) selecting a numerical aperture of the input of the subsequent dispersion stage, a magnification provided by the imaging optical assembly, a passband of the filter or slit, or a combination thereof such that the second portion input to the subsequent dispersion stage is attenuated,
wherein (d) is performed prior to (a)-(c).

16. The method of claim 13, further comprising, prior to (a) or during (b), adjusting a passband of the filter or slit to change wavelengths associated with the first portion.

17. The method of claim 11, further comprising, after (c), detecting spatially separated components, wherein the detected components are at least one of Brillouin scattered light, Raman scattered light, Rayleigh-wing scattered light, Raman fluorescence light, or Rayleigh-wing fluorescence light.

18. The method of claim 11, further comprising: after (d), using an output from (c), further spatially separating along a third dispersion axis, wherein the second dispersion axis is substantially parallel to the third dispersion axis.

19. The method of claim 11, wherein:
(a) and (c) are performed using a same spectral dispersion stage, and
(b) comprises redirecting the first portion of the spatially-separated spectral components output from the spectral dispersion stage back to an input of the spectral dispersion stage.

20. The method of claim 19, wherein the redirecting in (b) is such that a beam spot formed by the redirected first portion at the input of the spectral dispersion stage is parallel to and spatially offset from a beam spot formed by radiation provided to the input of the spectral dispersion stage in (a).

21. A parallel spectroscopy system comprising:
a dispersion stage constructed to spatially separate radiation input to the dispersion stage into respective spectral components along a dispersion axis; and
an optical assembly constructed to redirect the spectral components output from the dispersion stage back to an input of the dispersion stage, such that the radiation is processed by the dispersion stage more than once,
wherein the dispersion stage and the optical assembly are constructed such that the dispersion axes for an initial radiation input and for a subsequent input redirected by the optical assembly are substantially parallel, and
the optical assembly is constructed to filter out a set of wavelengths in the spectral components in the output from the dispersion stage while allowing another set of wavelengths in the spectral components in the output from the dispersion stage to pass back to the dispersion stage as the subsequent input.

22. A parallel spectroscopy system comprising:
a dispersion stage constructed to spatially separate radiation input to the dispersion stage into respective spectral components along a dispersion axis; and
an optical assembly constructed to redirect the spectral components output from the dispersion stage back to an input of the dispersion stage, such that the radiation is processed by the dispersion stage more than once,
wherein the dispersion stage and the optical assembly are constructed such that the dispersion axes for an initial radiation input and for a subsequent input redirected by the optical assembly cross each other, and
the optical assembly is constructed to redirect all wavelengths in the spectral components in the output from the dispersion stage to back to the dispersion stage as the subsequent input.

* * * * *